(12) United States Patent
Wang (10) Patent No.: US 8,738,953 B2
(45) Date of Patent: May 27, 2014

(54) POWER-SAVING DEVICE FOR UNIVERSAL SERIAL BUS MODEM APPARATUS AND METHOD THEREOF

(75) Inventor: Wei Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 228 days.

(21) Appl. No.: 13/391,780

(22) PCT Filed: Apr. 22, 2010

(86) PCT No.: PCT/CN2010/072060
§ 371 (c)(1),
(2), (4) Date: Feb. 22, 2012

(87) PCT Pub. No.: WO2011/022976
PCT Pub. Date: Mar. 3, 2011

(65) Prior Publication Data
US 2012/0151239 A1    Jun. 14, 2012

(30) Foreign Application Priority Data

Aug. 26, 2009  (CN) .......................... 2009 1 0091628

(51) Int. Cl.
*G06F 1/32*    (2006.01)
(52) U.S. Cl.
CPC .................................. *G06F 1/3278* (2013.01)
USPC ............................ 713/324; 713/320; 713/323
(58) Field of Classification Search
CPC .................................................. G06F 1/3278
USPC ......................................... 713/320, 323, 324
See application file for complete search history.

(56) References Cited

U.S. PATENT DOCUMENTS

| 8,255,708 | B1 * | 8/2012 | Zhang ........................... 713/300 |
| 2005/0198417 | A1 * | 9/2005 | Chaiken et al. ................ 710/104 |
| 2007/0005824 | A1 * | 1/2007 | Howard .......................... 710/18 |
| 2007/0083873 | A1 * | 4/2007 | Roychoudhury et al. ..... 719/321 |
| 2009/0006690 | A1 | 1/2009 | Vembu et al. |
| 2009/0103597 | A1 | 4/2009 | Choi et al. |
| 2009/0204965 | A1 * | 8/2009 | Tanaka et al. ..................... 718/1 |
| 2009/0216981 | A1 * | 8/2009 | Diefenbaugh et al. ........ 711/163 |
| 2010/0049881 | A1 * | 2/2010 | Manor et al. .................... 710/18 |

FOREIGN PATENT DOCUMENTS

| CN | 101281418 A | 10/2008 |
| CN | 101308399 A | 11/2008 |

(Continued)

OTHER PUBLICATIONS

International Search Report for PCT/CN2010/072060 dated Jun. 15, 2010.

*Primary Examiner* — Vincent Tran
(74) *Attorney, Agent, or Firm* — Ling Wu; Stephen Yang; Ling and Yang Intellectual Property (57) ABSTRACT

A power-saving apparatus for universal serial bus (USB) modem equipment is disclosed in the present invention, which includes: a personal computer and USB Modem equipment. Accordingly, a power-saving method for USB Modem equipment is provided in the present invention, which includes: regularly detecting whether selective suspending is allowed, if not allowed, processing a received request from an application program, and if allowed, transmitting an instruction for entering the selective suspending state to the USB Modem equipment; after receiving the instruction for entering the selective suspending state, the USB Modem equipment entering the selective suspending state. Thus, the present invention can realize that the USB Modem equipment enters the power-saving state in the idle period and resumes the work state when receiving a service request.

11 Claims, 4 Drawing Sheets

(56) References Cited

FOREIGN PATENT DOCUMENTS

| CN | 101630191 | A  | 1/2010  |
| EP | 1308827   | A2 | 5/2003  |
| EP | 1901155   | A2 | 3/2008  |
| EP | 2391178   | A1 | 11/2011 |
| JP | 2005216117| A  | 8/2005  |

\* cited by examiner

FIG. 5

POWER-SAVING DEVICE FOR UNIVERSAL SERIAL BUS MODEM APPARATUS AND METHOD THEREOF

TECHNICAL FIELD

The present invention relates to a wireless modem, and in particular, to a power-saving apparatus and method for a universal serial bus (USB) modem apparatus.

BACKGROUND OF THE RELATED ART

The broadband access ways adopted by the traditional computer to surf the internet are fixed lines, including a plurality of common methods, such as fiber-optic into door, digital subscriber line (DSL), cable, etc. The advantage of these broadband access ways includes: the high speed, the good stability, the cheap access cost; while the disadvantage is also very obvious, that is, lack of good mobility. If going out to travel or on business, the whenever and wherever possible broadband access is difficult to be realized, therefore the wireless technology of surfing the internet arises. The early way of wireless internet access mainly includes the general packet radio service (GPRS) and code division multiple access (CDMA) lx of the global system for mobile communications (GSM). Although these two access ways have realized wireless office, the speed is very low. As a result, the third generation communication technology (3G) appears, and the third generation communication technology provides a higher bandwidth, also provides a more stable and cheaper wireless broadband access way, which can not only provide the wireless internet access with a higher speed for the user, but also can perform the stronger data service, such as voice call, receiving and transmitting short messages and multimedia messages and so on, while surfing the internet. Therefore, the demand for the wireless data terminal products, mainly the wireless modem, is quite great, and at the same time in order to make the users use wireless data terminal products more conveniently and swiftly, it proposes a higher requirement for manufacturers of the wireless modem, especially in the aspect of user experience.

At present, the USB Modem equipment is widely applied to mobile office, while in the case of mobile application, it is often very difficult to use the notebook computer through the external AC power supply, thus it can only work by using a battery-powered method. However, the endurance ability of the battery is limited, in order to improve the endurance ability of the notebook computer, it is very essential to adopt the power-saving technology and improve the battery capacity. Wherein, the power-saving technology includes the power-saving technology of the notebook itself and the power-saving technology of the external equipment of the notebook, wherein, the USB Modem equipment is the external equipment. The setting mode of 3G USB Modem equipment generally includes: 1) external USB Modem equipment; 2) notebook computer or the built-in modem module in the mobile internet devices (MID), etc. If it is external USB Modem equipment, the user can also disassemble the USB Modem equipment without using it, but needs to keep supplying power to the built-in USB Modem equipment at any time, therefore, if not adopting the appropriate power-saving technology, it will produce a greater continuous power consumption while the notebook computer is used, thereby influencing the endurance ability of the notebook computer.

SUMMARY OF THE INVENTION

In view of this, the main purpose of the present invention is to provide a power-saving apparatus and method for USB Modem equipment, which makes the USB Modem equipment enter the power-saving state in the idle period and resume the work state when receiving a service request.

In order to achieve the above purpose, the present invention discloses a power-saving apparatus for universal serial bus (USB) Modem equipment, comprising a personal computer and USB Modem equipment; wherein, the personal computer (PC) regularly detects whether the USB Modem equipment is allowed to enter selective suspending, and sends an instruction for entering a selective suspending state to the USB Modem equipment when allowed, to notify the USB Modem equipment to enter the selective suspending state; and the USB Modem equipment enters the selective suspending state after receiving the instruction for entering the selective suspending state.

In the above apparatus, the PC comprises a multiplexing driver, a virtual interface driver, a USB-to-serial port driver and a USB Hub; wherein, the multiplexing driver is configured to virtualize a single USB physical interface into a plurality of virtual interfaces, receive and judge whether all virtual interfaces send an equipment control command, and when all virtual interfaces send the equipment control command, forward the equipment control command from the virtual interface driver to the USB-to-serial port driver in a lower layer; the virtual interface driver is configured to regularly detect whether the USB Modem equipment is allowed to enter selective suspending, and send the equipment control command to the multiplexing driver when allowed; the USB-to-serial port driver is configured to receive and forward the equipment control command to the USB hub; and the USB Hub is configured to send the instruction for entering the selective suspending state to the USB Modem equipment after receiving the equipment control command, and notify the USB Modem equipment to enter the selective suspending state.

Wherein, the USB Hub is further configured to receive a USB wakeup signal from the USB Modem equipment or a wakeup request of an upper layer application, and send a USB remote wakeup command to the USB Modem equipment to make the USB Modem equipment enter a normal work state; and finish an I/O request packet (IRP); the USB-to-serial port driver is further configured to provide a completion routine to confirm that the IRP finishes, and notify the multiplexing driver to resume the normal work; and the multiplexing driver is further configured to notify each virtual interface driver to resume the normal work.

Accordingly, the present invention provides a power-saving method for universal serial bus (USB) modem equipment, comprising: regularly detecting whether entering selective suspending is allowed, if not allowed, processing a received request from an application program; and if allowed, then transmitting an instruction for entering a selective suspending state to the USB Modem equipment; and after receiving the instruction for entering the selective suspending state, the USB Modem equipment entering the selective suspending state.

The above method further comprises: virtualizing a single USB physical interface into a plurality of virtual interfaces, that is: virtualizing non-complex equipment with the single USB physical interface into complex equipment with multiple virtual interfaces by using a multiplexing protocol.

Wherein, said regularly detecting whether entering the selective suspending is allowed refers to: a virtual interface driver detecting whether there is data reading or writing operation at the virtual interface within a set period of time, and if no data reading or writing operation, judging that the virtual interface is allowed to enter the selective suspending; or else, not allowing the virtual interface to enter the selective suspending.

In the above method, said transmitting the instruction for entering the selective suspending state to the USB Modem equipment refers to: a virtual interface driver sending the equipment control command to a multiplexing driver; the multiplexing driver receiving and forwarding the equipment control command to a USB-to-serial port driver in a lower layer; the USB-to-serial port driver receiving and forwarding the equipment control command to a USB Hub; and the USB Hub sending the instruction for entering the selective suspending state to the USB Modem equipment after receiving the equipment control command.

Wherein, before the multiplexing driver sends the equipment control command to the USB-to-serial port driver in the lower layer, the power-saving method further comprises: judging whether all virtual interfaces send the equipment control command, and if not, then continuously waiting until all virtual interfaces send the equipment control command; if all virtual interfaces send the equipment control command, then transmitting the equipment control command to the USB-to-serial port driver in the lower layer.

In the above method, after the USB Modem equipment enters the selective suspending state, the power-saving method further comprises: waking up the USB Modem equipment when there is a service request, indicating that: the USB Hub, after receiving a USB wakeup signal of the USB Modem equipment or a wakeup request of an upper layer application, sends a USB remote wakeup command to the USB Modem equipment to make the USB Modem equipment enter a normal work state, finishes an I/O request packet (IRP), and notifies the USB-to-serial port driver that the IRP finishes; a completion routine of the USB-to-serial port driver is called to confirm that the IRP finishes, and the multiplexing driver is notified to resume the normal work; and the multiplexing driver resumes the normal work and notifies each virtual interface driver to resume the normal work.

Wherein, said USB Hub receiving the wakeup request of the USB Modem equipment or upper layer application refers to: the USB Modem equipment sending the USB wakeup signal to the USB Hub after receiving the service request; or, the upper layer application starting the service request, and when a service request command reaches the USB-to-serial port driver, the USB-to-serial port driver sending a wakeup request for resuming the USB Modem equipment to the work state to the USB Hub.

It can be seen from the above technical scheme that the present invention makes different types of data to be transmitted in one serial port through introducing the multiplexing protocol, so as not to get muddled. And the multiplexing protocol is realized on the USB Modem equipment, thus it enables one USB interface to be virtualized into a plurality of virtual interfaces, to realize all the functions of the USB Modem equipment, and on the basis of such new framework, then realize the power-saving method of the USB Modem equipment in a plurality of platform environments of Windows. In Windows XP, that power-saving method can realize that a plurality of USB interfaces enter the power-saving state in the idle period of the equipment, which can realize the selective suspending and the remote wakeup function of the USB Modem equipment.

The major Windows systems mostly support the selective suspending and the remote wakeup, especially for the USB Modem equipment of the non-complex equipment type. However, it is comparatively special that the complex equipment driver usbccgp.sys of Windows XP system does not support the selective suspending of the complex equipment with a plurality of interfaces very well; in this way, for 3G USB Modem equipment, if made directly as the complex equipment, it will influence the stability of the selective suspending function. Therefore, the present invention takes into account that the non-complex equipment with a single interface of Windows can support the selective suspending function very well and the complex equipment virtualizing a single interface into a plurality of virtual interfaces through multiplexing at the same time, and thereby it can support the development and expansion of various functions of the USB Modem equipment very well, therefore realizing the power-saving scheme of a single interface framework based on the multiplexing. And in all above USB Modem equipment, no one realizes the above-mentioned power-saving scheme. Obviously, the present invention has a very good promotion function for the development and application of the data card in the future.

To sum up, the present invention improves the user experience and is more convenient in the use of the USB Modem equipment, and it can save energy by about 80% when the USB Modem equipment is idle, thereby reducing the power consummation of the communication module greatly, improving the endurance ability of the notebook and saving the power energy at the same time, which is favorable to environmental protection and accords with the idea of power-saving and environment protection very much which is advocated at present.

PREFERRED EMBODIMENTS OF THE PRESENT INVENTION

The basic idea of the present invention is to virtualize a single USB physical interface into a plurality of USB virtual interfaces through multiplexing, which realizes that the USB Modem equipment enters the power-saving state in the idle period and resumes the work state when receiving a service request.

It should be noted that the present invention abbreviates a virtual USB interface as a virtual interface. In addition, the USB Modem equipment includes all equipment which can be plugged in the USB physical interface of the personal computer (PC), such as Modem, mobile phone, etc.

Figure 1:
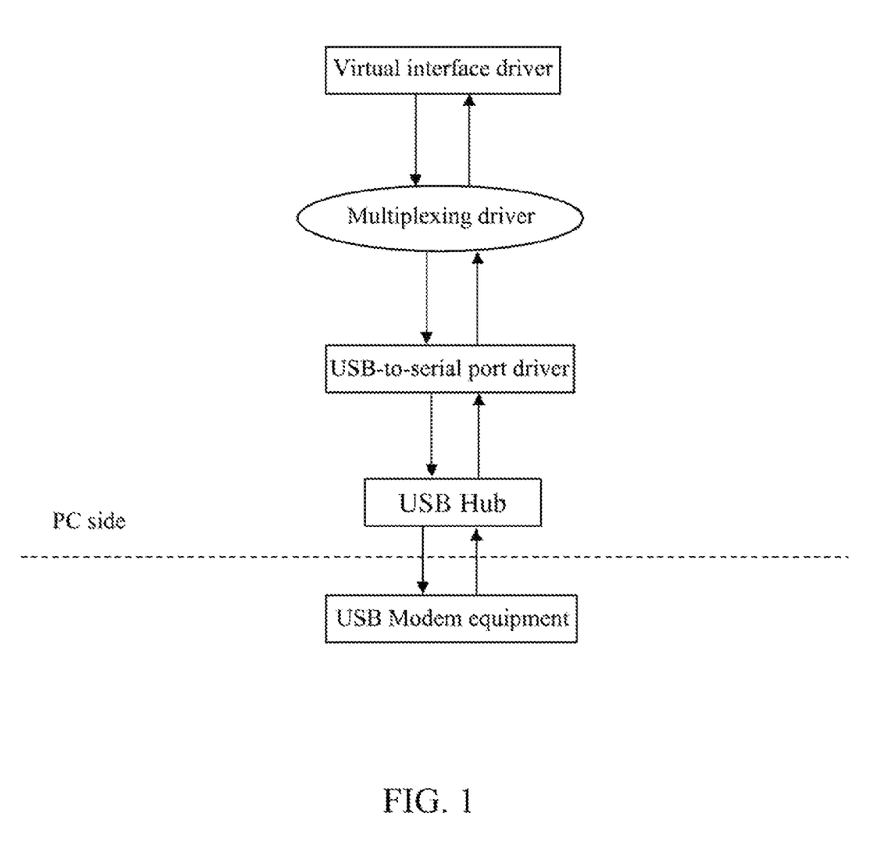
FIG. 1 is a structure schematic diagram of a power-saving apparatus of USB Modem equipment of the present invention.

In order to make the above-mentioned purposes, characteristics and advantages of the present invention more obvious and understandable, the present invention is further described in detail with reference to the accompanying drawings and in combination with embodiments hereinafter. FIG. 1 is a structure schematic diagram of a power-saving apparatus of USB Modem equipment provided by the present invention. The driver of PC side interacts with the USB Modem equipment through the USB interface on the PC, and virtualizes a single USB interface into a plurality of interfaces through the multiplexing and the single-board embedded software cooperating with the multiplexing driver in the USB Modem equipment, and enables the service function of the USB Modem equipment to realize the power-saving technology of the USB Modem equipment in the Windows system by using the way of the complex equipment of multiple virtual interfaces. That power-saving apparatus mainly includes:

a personal computer (PC), which virtualizes a single USB interface into a plurality of virtual interfaces, regularly detects whether the USB Modem equipment is allowed to enter selective suspending, and sends an instruction for entering the selective suspending state to the USB Modem equipment when allowed, to notify the USB Modem equipment to enter the selective suspending state; and the USB Modem equipment, which enters the selective suspending state after receiving the instruction for entering the selective suspending state.

The PC includes a multiplexing driver, a virtual interface driver, a USB-to-serial port driver and a USB hub; wherein, the multiplexing driver is configured to virtualize a single USB physical interface into a plurality of virtual interfaces, receive and judge whether all virtual interfaces send an equipment control command, and when all virtual interfaces send the equipment control command, forward the equipment control command from the virtual interface driver to the USB-to-serial port driver in a lower layer;

the virtual interface driver is configured to regularly detect whether the USB Modem equipment is allowed to enter selective suspending, and send the equipment control command to the multiplexing driver when allowed;

the USB-to-serial port driver is configured to receive and forward the equipment control command to the USB hub; and the USB Hub is configured to send the instruction for entering the selective suspending state to the USB Modem equipment after receiving the equipment control command, and notify the USB Modem equipment to enter the selective suspending state.

Wherein, the USB Hub is further configured to receive a USB wakeup signal from the USB Modem equipment or a wakeup request of an upper layer application, and send a USB remote wakeup command to the USB Modem equipment to make the USB Modem equipment enter a normal work state; and finish an I/O request packet (IRP);

the USB-to-serial port driver is further configured to provide a completion routine to confirm that the IRP finishes, and notify the multiplexing driver to resume the normal work; and the multiplexing driver is further configured to notify each virtual interface driver to resume the normal work.

Here, said finishing IRP includes generating an IRP and performs processing on the IRP, such as processing of the state bit and so on, and then calls a function to confirm that the IRP finishes.

The above description is a power-saving apparatus for the USB Modem equipment of the present invention, and accordingly, the present invention also provides a power-saving method for the USB Modem equipment. The multiplexing driver is illustrated firstly before introducing that power-saving method. The multiplexing protocol is realized in the multiplexing driver, and the multiplexing protocol is a sub-protocol in a GSM protocol, which is described relevantly in GSM 07.10 file and is the link connecting the terminal equipment (TE) and the mobile station (MS). The TE and the MS generally communicate through a serial port, and the problem lies in that there is only one serial port, while there are many kinds of the communication data types. Then the present invention virtualizes one USB physical interface into a plurality of virtual interfaces in the application layer through adopting the multiplexing protocol, to realize all the functions of the USB Modem equipment, and on the basis of such new framework, realize a power-saving method for the USB Modem equipment in a plurality of platform environments of Windows.

Specifically, the present invention creates a plurality of virtual interfaces according to the configuration file, and multiplexes the reading and writing data of a plurality of virtual interfaces in one USB physical interface, and the adopted multiplexing method is a multiplexing protocol. Thus, it enables the non-complex equipment with a single interface of Windows can support the selective suspending function very well, which solves the problem that it cannot support the selective suspending due to loading the driver of the complex equipment of the Windows system. Therefore, in the Windows system, the present invention can realize that a plurality of USB interfaces enter the power-saving state in the idle period of the USB Modem equipment. And then, the Windows system will consider the accessed USB Modem equipment to be the non-complex equipment with a single interface, thus it can support the development and expansion of various functions of the USB Modem equipment very well. Therefore, the present invention develops the power-saving scheme of the single interface framework based on the multiplexing, and this power-saving scheme is especially applicable to the built-in 3G USB Modem equipment of TD-SCDMA.

Wherein, the multiplexing protocol of the present invention needs to be realized with the support of the USB Modem equipment and the driver of PC side. The Windows equipment driver of PC side includes: a USB-to-serial port driver, virtual interface driver, multiplexing driver and so on for installing Windows desktop system.

And then, the control flow and reading and writing flow of the multiplexing driver is illustrated, wherein, the control flow is to coordinate with the illustration of the interaction process of the USB Modem equipment and Windows system, while the reading and writing flow concerns when the USB Modem equipment enters the power-saving mode.

Figure 2:
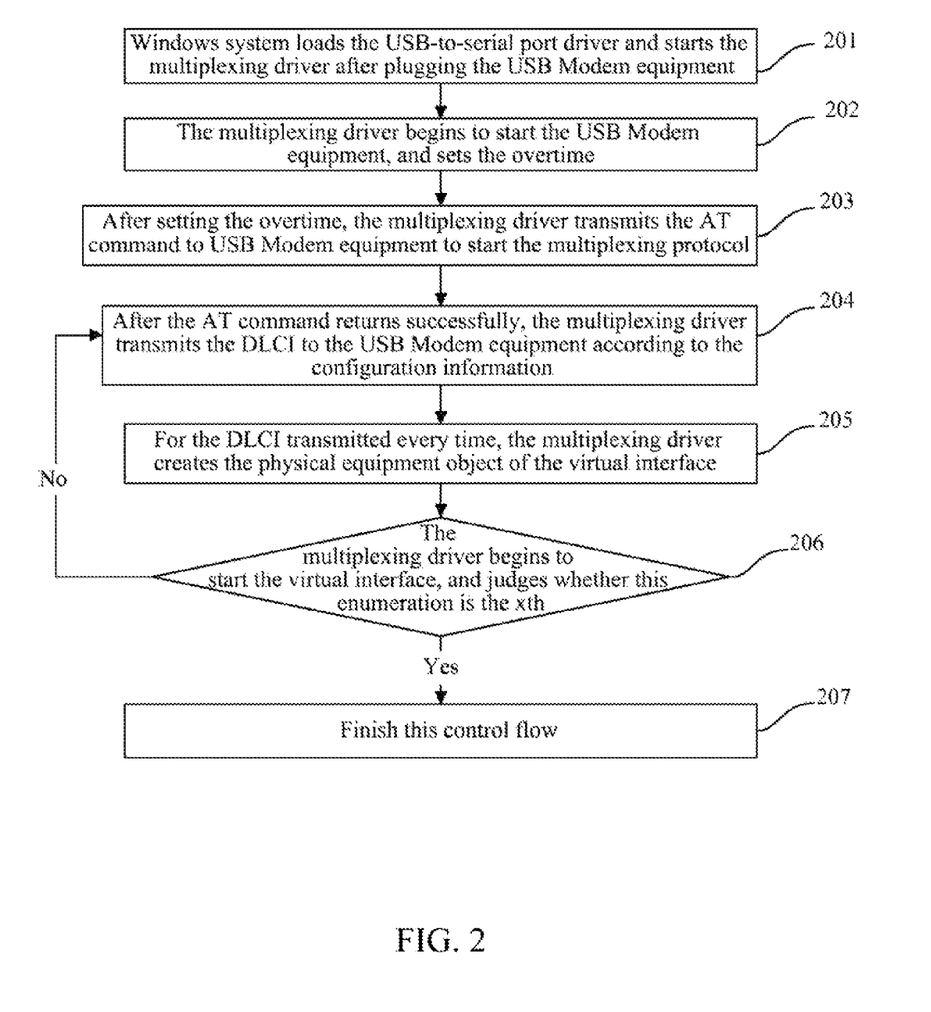
FIG. 2 is a control flow chart of a multiplexing driver.

I, the control flow of the multiplexing driver, as shown in FIG. 2, the main steps are as follows:

step 201, Windows system loads the USB-to-serial port driver and starts the multiplexing driver after plugging the USB Modem equipment;

after plugging the USB Modem equipment into Windows system, the system detects and loads the USB-to-serial port driver; when loading that USB-to-serial port driver, the Windows system will then load a serial port filter driver program and a multiplexing driver for the USB-to-serial port driver, and the plug and play (PNP) manager begins to start the multiplexing driver.

Step 202, the multiplexing driver begins to start the USB Modem equipment, and sets the overtime;

step 203, after setting the overtime, the multiplexing driver transmits the AT command to USB Modem equipment, to start the multiplexing protocol;

wherein, the multiplexing driver, through transmitting the AT command such as AT+CMUX, makes the USB Modem equipment start the multiplexing protocol.

Step 204, after the AT command returns successfully, the multiplexing driver transmits the data link connection identifier (DLCI) to the USB Modem equipment according to the configuration information;

wherein, if the AT command can return within the set overtime, then the AT command is considered as returning successfully; otherwise, the AT command is considered as failing. The configuration information is from the self-defined configuration file, including: technical parameters such as virtual interface quantity, name, interface number, etc. The transmission begins from DLCI 0 to DLCI x sequentially.

Step 205, for the DLCI transmitted every time, the multiplexing driver creates the physical equipment object of the virtual interface;

wherein, the multiplexing driver creates the physical equipment object of the virtual interface, and the enumeration is mainly from DLCI 0 to DLCI x sequentially. Here, the physical equipment object of the virtual interface is the equipment form after virtualizing the single USB physical interface into a plurality of interfaces, which is a plurality of virtual USB interfaces, i.e. virtual interfaces. Wherein, x is the quantity of virtual interfaces, which is set and recorded in the configuration file.

Step 206, the multiplexing driver begins to start the virtual interface and judges whether this enumeration is the xth; if this enumeration is not the xth, return to step 204; if the xth, execute step 207;

step 207, this control flow is finished.

Figure 3:
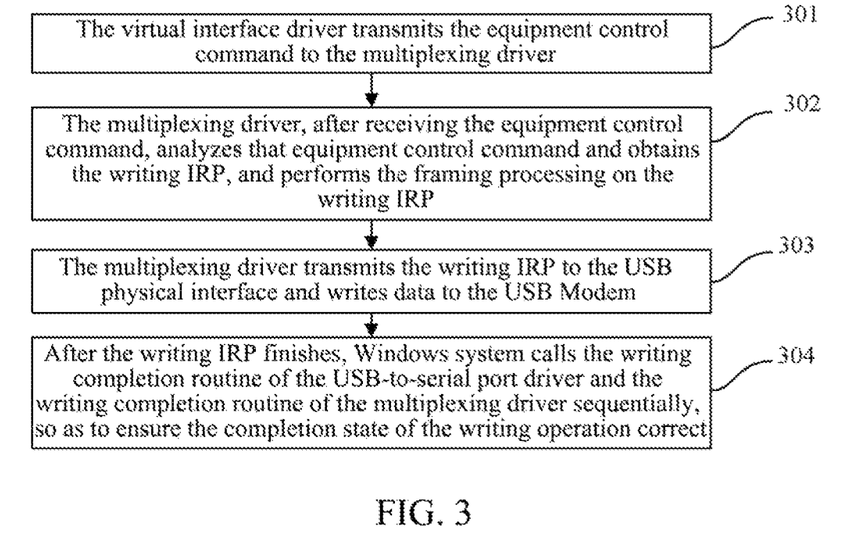
FIG. 3 is a flow chart of data writing of a multiplexing driver.

II, the writing data flow, as shown in FIG. 3, the main steps are as follows:

Step 301, the virtual interface driver transmits the equipment control command to the multiplexing driver;

wherein, the equipment control command is defined in Windows framework, divided into different types of equipment control commands, and that equipment control command includes an IRP for writing data, that is, writing IRP. Wherein, that IRP is an I/O request packet, allocated by Windows system, which is the system object triggered by the application program and also an interactive intermediary between the driver and driver. The virtual interface driver puts the data required to be written into the writing IRP, and then transmits it to the multiplexing driver.

Step 302, the multiplexing driver, after receiving the equipment control command, analyzes that equipment control command and obtains the writing IRP, and performs the framing processing on that writing IRP;

step 303, the multiplexing driver transmits the writing IRP to the USB physical interface, and writes data into the USB Modem equipment;

the multiplexing driver transmits the writing IRP to the USB-to-serial port driver, and the USB-to-serial port driver structures the URB according to the data in the writing IRP, and puts that URB into the internal equipment control command, and then transmits it to the USB Hub; and that USB Hub writes data into the USB Modem equipment. Wherein, the URB is the USB request packet.

Step 304, after the writing IRP finishes, Windows system calls the writing completion routine of the USB-to-serial port driver and the writing completion routine of the multiplexing driver sequentially, so as to ensure the completion state of the writing operation correct.

Figure 4:
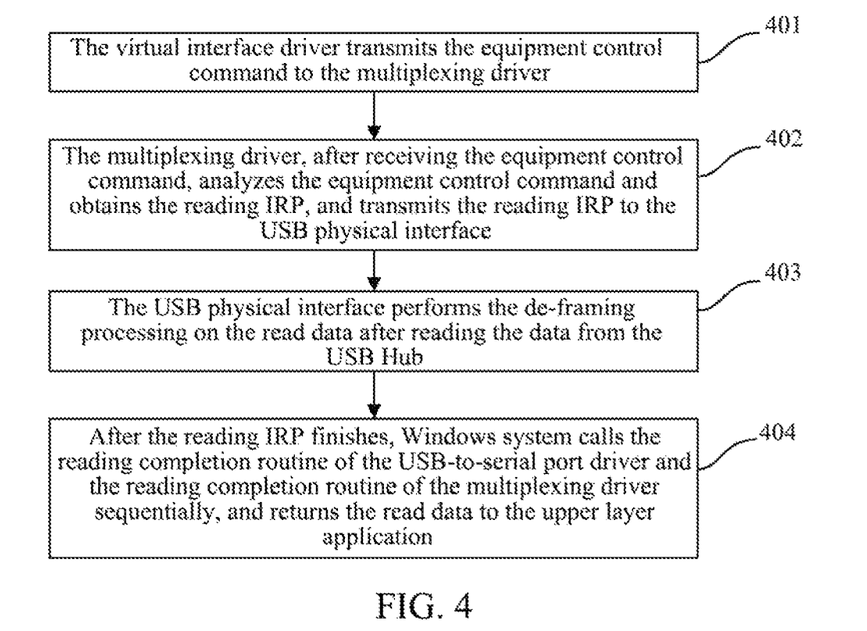
FIG. 4 is a flow chart of data reading of a multiplexing driver.

III, the reading data flow, as shown in FIG. 4, the main steps are as follows:

step 401, the virtual interface driver transmits the equipment control command to the multiplexing driver;

wherein, that equipment control command includes the reading IRP.

Step 402, the multiplexing driver, after receiving the equipment control command, analyzes the equipment control command and obtains the reading IRP, and transmits the reading IRP to the USB physical interface;

step 403, the USB physical interface performs the de-framing processing on the read data after reading the data from the USB Hub;

wherein, the specific reading data process belongs to Windows system mechanisms, and is related to the characteristic of the application program. For example: if the application program opens the equipment, there is one reading IRP pending in the USB Hub layer at any time; if there are data coming from the lower layer, the reading data flow is performed.

Step 404, after the reading IRP finishes, Windows system calls the reading completion routine of the USB-to-serial port driver and the reading completion routine of the multiplexing driver sequentially, and returns the read data to the upper layer application.

The above description is the control and the reading and writing flow of the multiplexing driver. Since in the process of writing or reading data, it is not allowed to enter the power-saving mode, therefore the reading and writing state is closely related to the condition for entering the power-saving mode. Therefore, combining with the above-mentioned flow, the power-saving method for the Modem equipment in the present invention is illustrated hereinafter.

Figure 5:
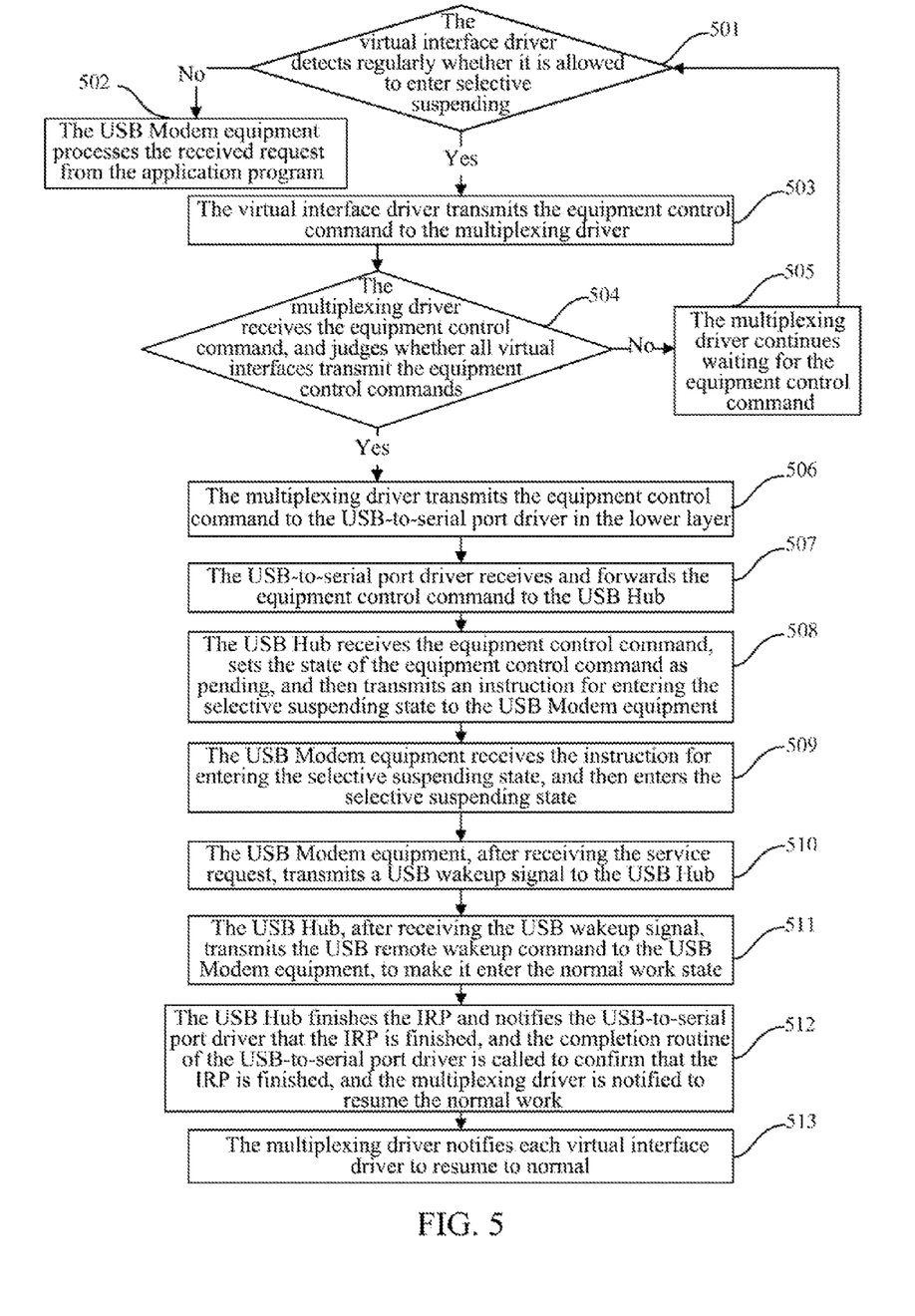
FIG. 5 is a flow chart of a power-saving method for USB Modem equipment of the present invention.

Referring to FIG. 5, the flow of the power-saving method for the USB Modem equipment in the present invention is shown. The present embodiment realizes the power-saving method for the USB Modem equipment through the multiplexing in a plurality of platform environments of Windows. In Windows system, the power-saving method can realize that a plurality of USB interface enters the power-saving state in the idle period of the USB Modem equipment. That is to say, the multiplexing protocol is realized in the USB Modem equipment, thereby realizing the selective suspending and remote wakeup function of the USB Modem equipment, to realize the power-saving function of the USB Modem equipment.

It should be noted that the selective suspending and remote wakeup function is defined in the USB protocol: there are totally four kinds of states for one USB Modem equipment, which are D0, D1, D2 and D3; the selective suspending is that the host computer side suspends the USB Modem equipment when needed, which makes the USB Modem equipment enter the D2 state; when required to perform the normal work, the USB Modem equipment transmits the wakeup request to the USB Hub, thereby making the USB Modem equipment resume from the suspending state and enter the remote wakeup state, that is, the D0 state. It should be pointed out that the multiplexing, the selective suspending and the remote wakeup are realized together based on the driver of PC side and the driver of USB Modem equipment side.

In the present embodiment, the power-saving method for the USB Modem equipment mainly includes the following steps:

step 501, the virtual interface driver detects regularly whether it is allowed to enter selective suspending; if not allowed, execute step 502; if allowed, execute step 503;

wherein, since the service function of the USB Modem equipment is realized by way of the complex equipment with a plurality of interfaces, one USB physical interface is virtualized into a plurality of virtual interfaces through the multiplexing, and every virtual interface corresponds to one virtual interface driver. That virtual interface driver is an equipment driver program corresponding to the virtual serial port equipment, such as the USB Modem equipment, which is used for converting and simulating the operation of application program on the virtual interface.

In this step, the virtual interface driver detects whether its corresponding virtual interface satisfies the condition for allowing to enter the selective suspending, for example: it is judged whether to receive a request from the application program of the upper layer using the USB Modem equipment in a set period of time like 5 seconds, such as reading and writing data operation and so on; if the virtual interface driver does not receive the request from the application program, it is judged that the virtual interface is in the idle state.

Step 502, the USB Modem equipment processes a received request from the application program;

step 503, the virtual interface driver transmits the equipment control command to the multiplexing driver;

wherein, the equipment control command is an equipment idle state notification, used to notify the driver in the lower layer that the USB Modem equipment is idle and entering the selective suspending is allowed. For example: The equipment control command is INTERNAL_USB_SUBMIT_IDLE_NOTIFICATION.

Step 504, the multiplexing driver receives the equipment control command, and judges whether all virtual interfaces transmit the equipment control commands; if not, execute step 505; if all virtual interface transmits the equipment control commands, execute step 506; step 505, the multiplexing driver continues waiting for the equipment control command, and then return to step 501;

wherein, the multiplexing driver continues waiting for the equipment control command, and judges through step 504 when the equipment control command comes, until all virtual interfaces transmit the equipment control commands. Here, when the multiplexing driver waits for the equipment control commands of other virtual interface drivers, if the virtual interface driver which has already transmitted the equipment control command needs to perform the reading and writing or there is a service coming, the equipment control command transmitted hereinbefore will be cancelled. Therefore, even if receiving the equipment control commands of all other virtual interface drivers during this period, it still cannot be suspended, until all virtual interface drivers transmit the equipment control commands.

Step 506, the multiplexing driver transmits the equipment control command to the USB-to-serial port driver in the lower layer;

step 507, the USB-to-serial port driver receives and forwards the equipment control command to the USB Hub;

step 508, the USB Hub receives the equipment control command, and sets the state of the equipment control command as pending, and then transmits an instruction for entering the selective suspending state to the USB Modem equipment;

step 509, the USB Modem equipment receives the instruction for entering the selective suspending state, and then enters the selective suspending state.

The USB Modem equipment suspends and enters the low power consumption state, until a short message service, voice service or data service comes. It should be pointed out that, after each virtual interface of the USB Modem equipment transmits the equipment control command, the USB Modem equipment should only suspend. However, when performing the remote wakeup, one virtual interface will wake up the whole USB Modem equipment when receiving the service request.

So far, the above description is the realization process of the selective suspending, and then the remote wakeup is illustrated hereinafter. In the present embodiment, the remote wakeup includes two approaches: one is a wakeup from the equipment itself; the other is a wakeup from the application program of the upper layer.

Step 510, the USB Modem equipment, after receiving the service request, transmits a USB wakeup signal to the USB Hub;

step 511, the USB Hub, after receiving the USB wakeup signal, transmits the USB remote wakeup command (such as the clear feature) to the USB Modem equipment, to make it enter the normal work state;

wherein, the USB Modem equipment, after receiving the clear feature, resumes the normal work.

Step 512, the USB Hub finishes the IRP and notifies the USB-to-serial port driver that the IRP is finished, and the completion routine of the USB-to-serial port driver is called to confirm that the IRP is finished, and the multiplexing driver is notified to resume the normal work;

here, said finishing IRP refers to generate the IRP and perform the processing on the IRP, such as the processing of the state bit and so on, and then the completion routine of the USB-to-serial port driver is called to confirm that the IRP is finished. After confirming that the IRP is finished, the USB-to-serial port driver notifies the multiplexing driver.

Step 513, the multiplexing driver notifies each virtual interface driver to resume the normal.

It should be pointed out that the above wakeup method has another implementation way, which is the wakeup from the upper application, of which the main implementation processes are as follows:

The upper layer application program initiates a service request with the virtual interface, and when the service request command reaches the USB-to-serial port driver, that USB-to-serial port driver transmits the wakeup request for resuming the USB Modem equipment to the work state to the USB Hub, and that USB Hub transmits the USB remote wakeup command (clear feature) to the USB Modem equipment, to wake up the USB Modem equipment, and that USB Modem equipment resumes the work state after receiving the clear feature, for example entering the normal state, D0 state. After the USB Hub finishes the IRP, the completion routine of the USB-to-serial port driver is called to confirm that the IRP is finished. After confirming that the IRP is finished, the USB-to-serial port driver notifies the multiplexing driver to resume the work state, and the multiplexing driver notifies each virtual interface driver to resume the normal.

For each above-mentioned embodiment, it is described as a series of movement combination for simple description; however, those skilled in the art should know that the present invention is not limited by the described movement order, because some steps can be carried out in other orders or carried out at the same time according to the present invention.

In the above embodiment, the description places particular emphasis on each embodiment. The part not specified in a certain embodiment can refer to the relevant description of other embodiments. The above description is only the preferred embodiments of the present invention, which is only for illustration and explanation of the present invention and is not intended to limit the protection scope of the present invention. Based on the present invention, all modifications or the equivalent replacements without departing from the spirit and scope of the appended claims of the present invention should be included in the protection scope of the present invention.

What is claimed is:

1. A power-saving apparatus for universal serial bus (USB) Modem equipment, comprising a personal computer (PC) and USB Modem equipment; wherein, the PC regularly detects whether the USB Modem equipment is allowed to enter selective suspending, and sends an instruction for entering a selective suspending state to the USB Modem equipment when allowed, to notify the USB Modem equipment to enter the selective suspending state;

the USB Modem equipment enters the selective suspending state after receiving the instruction for entering the selective suspending state;

the PC comprises a multiplexing driver, a virtual interface driver, a USB-to-serial port driver and a USB Hub; wherein, the multiplexing driver is configured to virtualize a single USB physical interface into a plurality of virtual interfaces, receive and judge whether all virtual interfaces send an equipment control command, and when all virtual interfaces send the equipment control command, forward the equipment control command from the virtual interface driver to the USB-to-serial port driver in a lower layer;

the virtual interface driver is configured to regularly detect whether the USB Modem equipment is allowed to enter the selective suspending, and send the equipment control command to the multiplexing driver when allowed;

the USB-to-serial port driver is configured to receive and forward the equipment control command to the USB hub; and the USB Hub is configured to send the instruction for entering the selective suspending state to the USB Modem equipment after receiving the equipment control command, and notify the USB Modem equipment to enter the selective suspending state.

2. The power-saving apparatus for USB Modem equipment according to claim 1, wherein, the USB Hub is further configured to receive a USB wakeup signal from the USB Modem equipment or a wakeup request of an upper layer application, and send a USB remote wakeup command to the USB Modem equipment to make the USB Modem equipment enter a normal work state; and finish an I/O request packet (IRP);

the USB-to-serial port driver is further configured to provide a completion routine to confirm that the IRP finishes, and notify the multiplexing driver to resume normal work;

the multiplexing driver is further configured to notify each virtual interface driver to resume the normal work.

3. A power-saving method for universal serial bus (USB) modem equipment, comprising:

regularly detecting whether entering selective suspending is allowed, and if not allowed, processing a received request from an application program; and if allowed, then transmitting an instruction for entering a selective suspending state to the USB Modem equipment; and after receiving the instruction for entering the selective suspending state, the USB Modem equipment entering the selective suspending state;

wherein said transmitting the instruction for entering the selective suspending state to the USB Modem equipment refers to:

a virtual interface driver sending a equipment control command to a multiplexing driver;

the multiplexing driver receiving the equipment control command;

the multiplexing driver judging whether all virtual interfaces send the equipment control command, and if not, continuously waiting until all virtual interfaces send the equipment control command; if all virtual interfaces send the equipment control command, transmitting the equipment control command to a USB-to-serial port driver in a lower layer;

the USB-to-serial port driver receiving and forwarding the equipment control command to a USB Hub;

the USB Hub sending the instruction for entering the selective suspending state to the USB Modem equipment after receiving the equipment control command.

4. The power-saving method for USB Modem equipment according to claim 3, further comprising: virtualizing a single USB physical interface into a plurality of virtual interfaces, which refers to:

virtualizing non-complex equipment with the single USB physical interface into complex equipment with multiple virtual interfaces by using a multiplexing protocol.

5. The power-saving method for USB Modem equipment according to claim 4, wherein, after the USB Modem equipment enters the selective suspending state, the power-saving method further comprises:

waking up the USB Modem equipment when there is a service request, indicating that:

a USB Hub, after receiving a USB wakeup signal of the USB Modem equipment or a wakeup request of an upper layer application, sends a USB remote wakeup command to the USB Modem equipment to make the USB Modem equipment enter a normal work state, finishes an I/O request packet (IRP), and notifies the USB-to-serial port driver that the IRP finishes;

a completion routine of the USB-to-serial port driver is called to confirm that the IRP finishes, and the multiplexing driver is notified to resume normal work;

the multiplexing driver resumes the normal work and notifies each virtual interface driver to resume the normal work.

6. The power-saving method for USB Modem equipment according to claim 5, wherein, the USB Hub receives the wakeup request of the USB Modem equipment or upper layer application refers to:

the USB Modem equipment sending the USB wakeup signal to the USB Hub after receiving the service request; or, the upper layer application starting the service request, and when a service request command reaches the USB-to-serial port driver, the USB-to-serial port driver sending the wakeup request for resuming the USB Modem equipment to work state to the USB Hub.

7. The power-saving method for USB Modem equipment according to claim 3, wherein, said regularly detecting whether entering selective suspending is allowed refers to:

a virtual interface driver detecting whether there is data reading or writing operation at a virtual interface within a set period of time, and if no data reading or writing operation, judging that the virtual interface is allowed to enter the selective suspending; or else, not allowing the virtual interface to enter the selective suspending.

8. The power-saving method for USB Modem equipment according to claim 7, wherein, after the USB Modem equipment enters the selective suspending state, the power-saving method further comprises:

waking up the USB Modem equipment when there is a service request, indicating that:

a USB Hub, after receiving a USB wakeup signal of the USB Modem equipment or a wakeup request of an upper layer application, sends a USB remote wakeup command to the USB Modem equipment to make the USB Modem equipment enter a normal work state, finishes an I/O request packet (IRP), and notifies the USB-to-serial port driver that the IRP finishes;

a completion routine of the USB-to-serial port driver is called to confirm that the IRP finishes, and the multiplexing driver is notified to resume normal work;

the multiplexing driver resumes the normal work and notifies each virtual interface driver to resume the normal work.

9. The power-saving method for USB Modem equipment according to claim 8, wherein, the USB Hub receives the wakeup request of the USB Modem equipment or upper layer application refers to:

the USB Modem equipment sending the USB wakeup signal to the USB Hub after receiving the service request; or, the upper layer application starting the service request, and when a service request command reaches the USB-to-serial port driver, the USB-to-serial port driver sending the wakeup request for resuming the USB Modem equipment to work state to the USB Hub.

10. The power-saving method for USB Modem equipment according to claim 3, wherein, after the USB Modem equipment enters the selective suspending state, the power-saving method further comprises:

waking up the USB Modem equipment when there is a service request, indicating that:

a USB Hub, after receiving a USB wakeup signal of the USB Modem equipment or a wakeup request of an upper layer application, sends a USB remote wakeup command to the USB Modem equipment to make the USB Modem equipment enter a normal work state, finishes an I/O request packet (IRP), and notifies the USB-to-serial port driver that the IRP finishes;

a completion routine of the USB-to-serial port driver is called to confirm that the IRP finishes, and the multiplexing driver is notified to resume normal work;

the multiplexing driver resumes the normal work and notifies each virtual interface driver to resume the normal work.

11. The power-saving method for USB Modem equipment according to claim 10, wherein, the USB Hub receives the wakeup request of the USB Modem equipment or upper layer application refers to:

the USB Modem equipment sending the USB wakeup signal to the USB Hub after receiving the service request; or, the upper layer application starting the service request, and when a service request command reaches the USB-to-serial port driver, the USB-to-serial port driver sending the wakeup request for resuming the USB Modem equipment to work state to the USB Hub.

* * * * *